(12) United States Patent
Gafner

(10) Patent No.: US 6,183,175 B1
(45) Date of Patent: Feb. 6, 2001

(54) STEERABLE TOOLHOLDER

(76) Inventor: Rudolf Gafner, Dorfstrasse 328, CH-5054 Kirchleerau (CH)

( * ) Notice: Under 35 U.S.C. 154(b), the term of this patent shall be extended for 0 days.

(21) Appl. No.: 09/297,433

(22) PCT Filed: Oct. 15, 1997

(86) PCT No.: PCT/CH97/00389

§ 371 Date: Apr. 29, 1999

§ 102(e) Date: Apr. 29, 1999

(87) PCT Pub. No.: WO98/18589

PCT Pub. Date: May 7, 1998

(30) Foreign Application Priority Data

Oct. 29, 1996 (CH) .................................................. 2659/96

(51) Int. Cl.⁷ .................................................. B23G 1/32
(52) U.S. Cl. .................................. 409/74; 74/397; 409/66
(58) Field of Search ................... 409/66, 74, 71, 409/68, 73, 78; 74/397

(56) References Cited

U.S. PATENT DOCUMENTS

| | | | |
|---|---|---|---|
| 3,526,167 | * | 9/1970 | Escobedo ................................ 409/74 |
| 3,690,220 | * | 9/1972 | Escobedo ........................... 409/74 X |
| 3,762,272 | * | 10/1973 | Escobedo ................................ 409/74 |
| 4,125,057 | | 11/1978 | Cox . |
| 4,606,683 | * | 8/1986 | Link et al. ............................... 409/66 |
| 5,143,492 | * | 9/1992 | Leeb ................................... 409/71 X |
| 5,960,671 | * | 10/1999 | Nguyen ................................... 74/397 |

FOREIGN PATENT DOCUMENTS

| | | |
|---|---|---|
| 682 891 A5 | 12/1993 | (CH) . |
| 25 16 775 | 10/1976 | (DE) . |
| 0 237 035 | 9/1987 | (EP) . |
| 20 456 | 3/1918 | (FR) . |

\* cited by examiner

*Primary Examiner*—William Briggs
(74) *Attorney, Agent, or Firm*—Pauley Petersen Kinne & Fejer

(57) ABSTRACT

A tool holder for a tool drive with an outer and an inner concentric drive shaft. A first adapter is detachably held by a conventional clamping system in a receptacle of the outside drive shaft. A second adapter is concentrically mounted in the first tool receptacle of the first adapter so as to rotate with respect to the first adapter. The second adapter has a tool receptacle which can be inclined by a pivoting element. Thus, a tool can be eccentrically inserted and concentrically driven. This makes possible certain machining modes, for example the machining of a hollow shaft, since inner threads can now be turned rather than cut.

4 Claims, 3 Drawing Sheets

STEERABLE TOOLHOLDER

BACKGROUND OF THE INVENTION

1. Field of the Invention

This invention relates to a tool holder for a tool drive device.

2. Description of Prior Art

Interior threads, for example, have been produced by drilling and subsequent cutting, or respectively turning, of an interior thread which requires two work steps in succession. The cut threads are machine-cut threads. With the production of exterior threads it is possible to achieve a faster production speed, for example if the thread is generated by milling. Larger threads and exterior threads are produced by turning or milling on three-axis machines in three operations, and often have unacceptable tolerances in the geometry of roundness.

SUMMARY OF THE INVENTION

This invention has one object of creating a tool holder for clamping and operating a milling tool or a thread rolling die so that an inner thread can also be milled or rolled. In this case it should be possible to avoid unacceptable geometry tolerances.

This object is attained by this invention as described in the specification and outlined in the claims.

According to one advantage of this invention, it is possible with the tool holder of this invention to mill interior blind bores, also called pocket hole bores, even into a hollow shaft, for example. This provides completely new constructions, since a blind bore can have a larger diameter in the back in an area of its closed end than in an area which is open toward the outside.

A further advantage of this invention is that the clamped tool can be displaced and adjusted during the operation.

A tool holder with two concentric shafts is known from German Patent Reference DE-A-25 16 775. A tool receptacle for a thread milling cutter is pivotably arranged on an arm which is pivoted out by a worm gear by a defined amount. The tool, such as a thread milling cutter, is rotated about its own axis in the tool receptacle via this gear. The entire tool holder is simultaneously rotated around its axis. Thus the milling cutter actually describes a circular path in the course of the milling work which, with the simultaneous coordinated feeding, allows milling of a thread. The two concentric shafts in the gear are connected with each other by a gear with a fixed gear ratio. The tool holder is driven by a common driveshaft of a tool driving device.

BRIEF DESCRIPTION OF THE DRAWINGS

A tool holder in accordance with preferred embodiments of this invention will be described in connection with the drawings wherein.

DESCRIPTION OF PREFERRED EMBODIMENT

Figure 1:
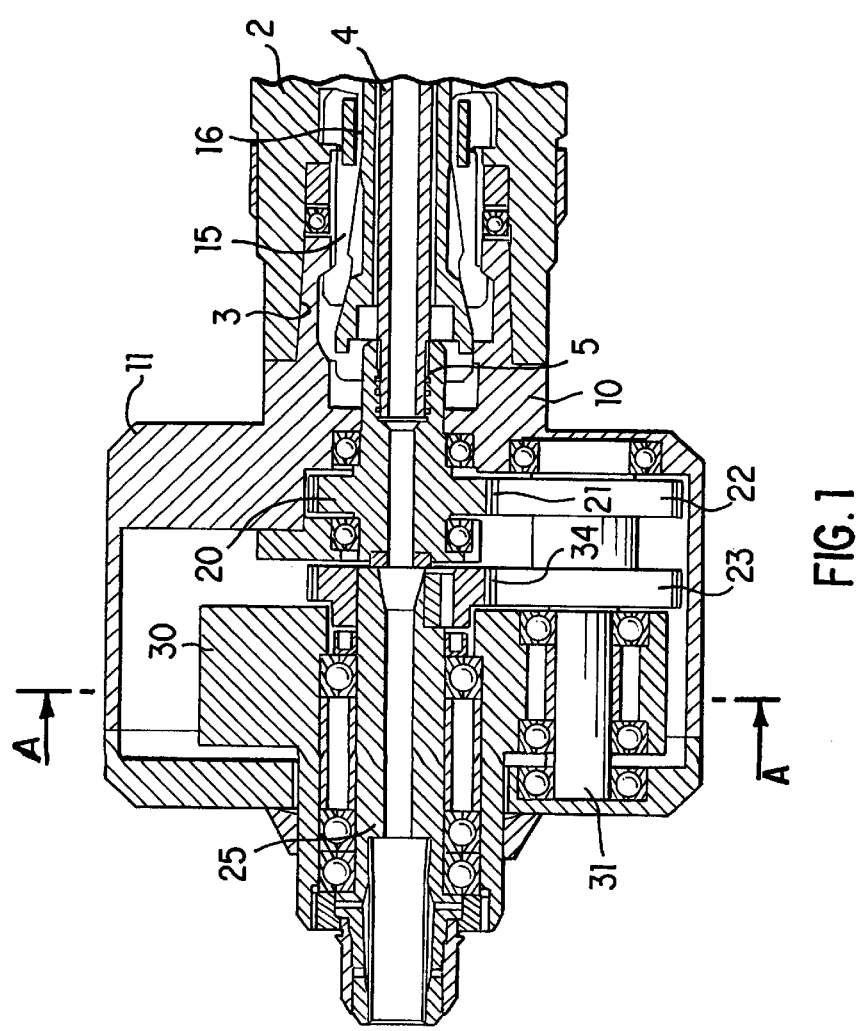
FIG. 1 is a longitudinal cross section of a tool holder, namely in accordance with the prior art.

The basis for the tool holder 1 of this invention is clearly shown in FIG. 1, namely a suitable drive device for a machine tool. The drive device comprises an exterior, hollow driveshaft 2 and an interior driveshaft 4, which is concentrically arranged in the exterior driveshaft 2. The exterior driveshaft 2 has, in a customary manner, a receiver for a first adapter. The interior driveshaft 4 is concentrically conducted through the hollow exterior driveshaft 2. The interior drive shaft 4 can be operated synchronously or a synchronously to the exterior driveshaft 2 with respect to its number of revolutions. The interior driveshaft 4 can also be a hollow shaft. In that case, a hollow space of the interior driveshaft 4 can be used as a supply line for coolant, lubricant and/or compressed air.

Electric motors with concentric shafts are suitable as the driving means, thus the driveshaft of a first electric motor is concentrically passed through a hollow driveshaft of a second electric motor. Such motors are also known by the term cascade motors. Similar drive devices are also known in the form of a pure gear with two concentric driveshafts.

Examples of drives with two concentric driveshafts are, for example, a dual-shaft drive, described in the journal *Schweizer Maschinenmarkl* No. 20/1995, pages 94, 95 (Ellen-Christine Reiff). Another version of such a drive is represented by the coupling of two electric motors seated one behind the other. This is described in Swiss Patent Reference CH 682891 (Garu AG). Both have an exterior driveshaft and an interior driveshaft, which can be driven dependently or independently of each other. They can also be coupled with each other by means of a gear.

A tool holder 1 in accordance with this invention has a first adapter 10, which has a first concentric tool receptacle 3. The first adapter 10 is releasably held by means of a clamping system 15 with a clamping element 16 in a tool receptacle 3 of the exterior driveshaft 2. A second adapter 20 is concentrically located inside the first tool receptacle 3 of the first adapter 10 and is rotatably seated in relation to the latter. The second adapter 20 contains a second tool receptacle 25, which is seated, deflectable about a pivot shaft 31 seated eccentrically and parallel with the concentric driveshafts 2, 4, on the first adapter 10 by means of a pivot element 30. In this case the second adapter 20 is in releasable connection with the interior concentric driveshaft 4, which passes through the clamping element 16. Here, a connection is suitable, for example by means of an Oldham coupling, or also simply by means of an interior hexagon on the second adapter 20 for engagement with an exterior hexagon 5 on the interior concentric shaft 4.

The second tool receptacle 25 by means of a gear, comprises gear wheels 22, 23, 34 and the adapter 20, which is designed as a radial gear wheel 21 on the exterior. A second gear wheel 22 is fixedly connected with a third gear wheel 23 and with the third ear wheel 23 is eccentrically seated on a rotary shaft on the first adapter 10, and is driven by the gear wheel 21, wherein the third gear wheel 23 in turn drives a fourth gear wheel 34. The fourth gear wheel 34 is fixedly connected with the second tool receptacle 25. The rotary shaft of the second and third gear wheels 22, 23 simultaneously form a pivot shaft 31 for the pivot element 30. The pivot element 30 in turn provides the guide and holder for the second tool receptacle 25. Therefore the pivot shaft 31 is parallel with and at a distance from the two concentric shafts 2, 4.

The second tool receptacle 25 can therefore be driven by the inner concentric shaft 4. The drive is performed via the second adapter 20 by means of the gears 21, 22, 23, 34. The gear comprises a toothed rim on the second adapter 20, which in this way forms a first gear wheel 21 that engages with a second gear wheel 22. The second gear wheel 22 is fixedly connected with a third gear wheel 23 on the same shaft. The third gear wheel 23 in turn is in engagement with a fourth gear wheel 34, which is fixedly connected with the second tool receptacle 25. It is apparent that, in place of this gear with the different gear wheels, the force transfer can take place by other means, for example a toothed belt. In any case, to this extent the second tool receptacle 25 can be driven by the interior driveshaft 4 independently of the state of deflection.

Figure 2:
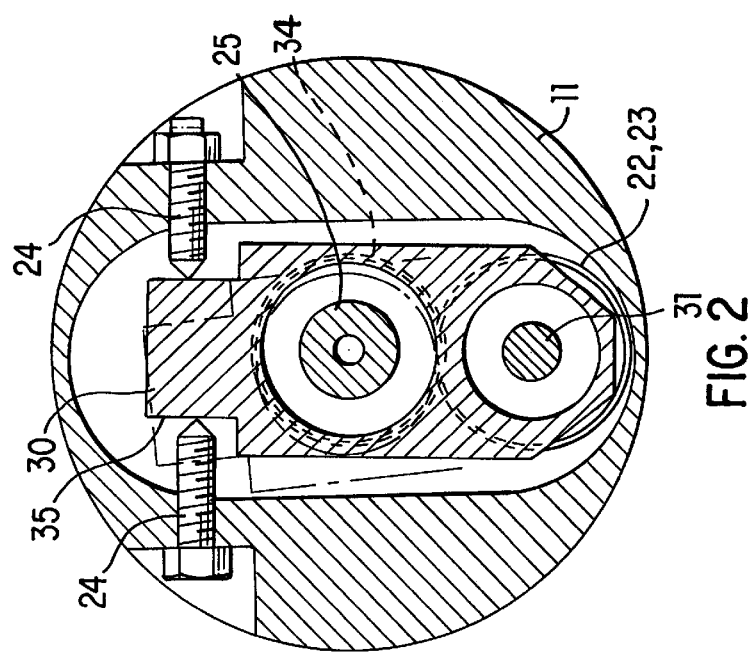
FIG. 2 is a sectional view of the tool holder shown in FIG. 1, taken along line A—A, as shown in FIG. 1.

In order to perform and to limit the position of t he pivot element 30, means for deflection are provided. In the embodiment shown in FIG. 2, the pivot element 30 has stops 35 on both sides in the area located opposite the pivot shaft 31. Displacement elements 24 are arranged on and in the housing of the first cylindrical body 11 of the first adapter in such a way that with their ends they cooperate with the stops 35 and in this way define and limit the deflection of the pivot element 30 and arrest the pivot element 30 in the desired position. These displacement elements 24 can usually comprise screws with threads. Alternatively a threaded bolt is used, which at least partially projects through the pivot element.

Figure 3:
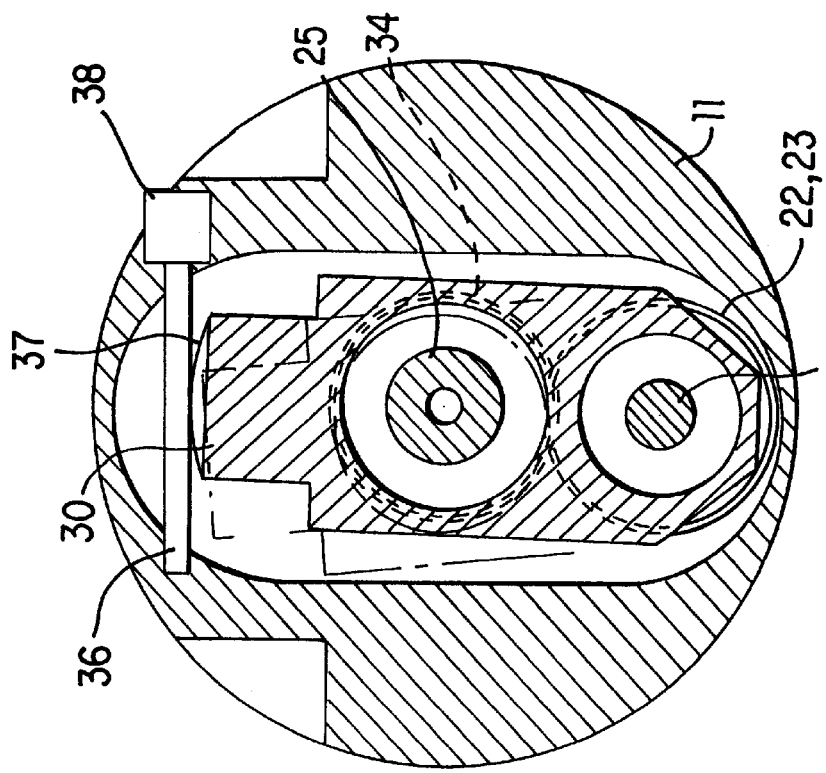
FIG. 3 is a sectional view of the tool holder in another deflection direction.

An embodiment with a worm drive for deflecting the pivot element 30 is shown in FIG. 3. A controllable micro motor 38 or step motor can be installed in the first adapter 10. In this case the micro motor 38 or step motor drives a helical shaft 36, which engages radially on the outside of the pivot element with corresponding teeth 37 on the pivot element. This embodiment makes possible a controlled pivoting without interruption during the processing of a workpiece. The required electrical supply lines can be passed through the hollow shaft, for example, and transmitted by means of slip rings. Thus, the deflection is controllable and adjustable even during operation.

Figure 4:
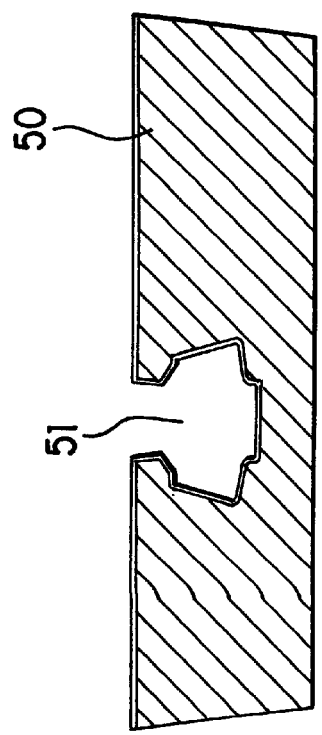
FIG. 4 is a cross section showing a possible pocket hole bore.

An example for a millable pocket hole bore is shown in FIG. 4. It can be clearly seen that, following the penetration of a smaller diameter through the surface, the pocket hole bore can be downwardly widened. In the process it is possible, depending on the milling head used, to produce approximately any arbitrary profile. The only limitation here results from the diameter and the shape of the milling head.

Figure 5:
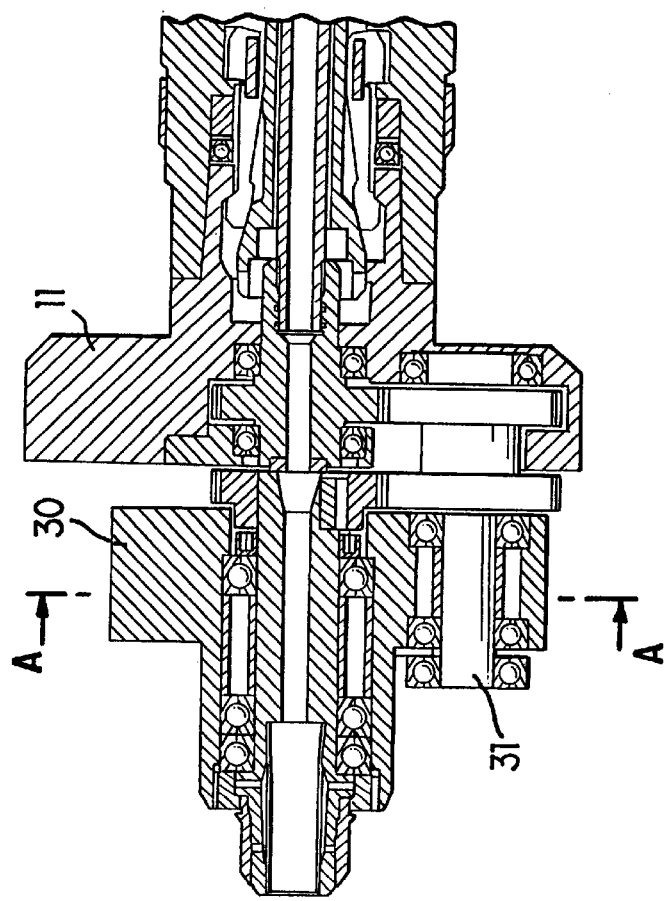
FIG. 5 is a sectional view of a further embodiment of the tool holder, with increased functional possibilities.
Figure 6:
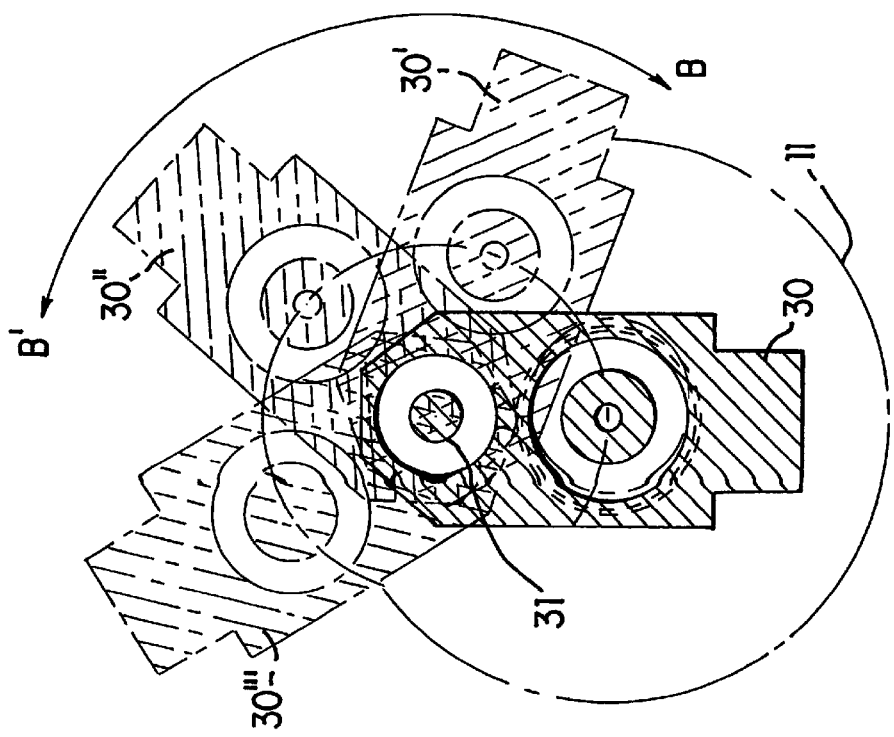
FIG. 6 is a plan view of the tool holder shown in FIG. 5, with a section taken along line A—A, as shown in FIG. 5.

Another function, or one expanded in the possibilities of its functioning, is shown in longitudinal section in FIG. 5, and in FIG. 6 in a plan view in section along line A—A, as shown in FIG. 5. The second tool receptacle 25, together with the first tool receptacle, is also driven via the first adapter 10 by the exterior concentric shaft 2. Thus, a tool clamped into the second tool receptacle 25 rotates at the speed of the first adapter 10. Normally the drive of the second adapter 20 rotates synchronously. This embodiment has no displacement elements 24 for deflecting the pivot element 20 and therefore for setting the eccentricity of the second tool receptacle 25. This now takes place via the gear wheels 21 to 23, 34. As long as the exterior concentric drive 2 and the interior concentric drive 4 rotate synchronously, for example at the same rotary speed in the same direction, the deflection state remains constant. If now the rotary speed of the inner concentric drive 4 is briefly, slightly reduced or increased, the pivot element 30 is deflected by means of the gear, since the difference in the rotary speeds, such as the relative movement of the two drives with respect to each other, drives this gear. Therefore the means for deflecting the pivot element 30 include the second adapter 20 and the gear itself, comprising the gear wheels 21, 22, 23, 34, and no further elements are thus needed. It is thus possible to adjust the eccentricity of the second tool receptacle in a controlled manner during the processing of a workpiece. This can be very easily achieved with one of the cascade motors mentioned, since their driveshafts can be individually and independently controlled. It is apparent that the housing 11 of the first adapter is not drawn forward over the pivot element 30. It is thus possible for the pivot element 30 to rotate by 360° around the pivot shaft 31 in the directions B to B'. For example, it then takes up the represented positions 30, 30', 30", 30'". This rotating movement can take place during the actual processing of a workpiece, such as during operation, simultaneously and continuously, as described above.

What is claimed is:

1. In a tool holder (1) for use with a tool drive device, having driving means for driving one of an exterior driveshaft (2) and a concentric interior driveshaft (4), wherein the tool holder (1) has a first adapter (10) having a first concentric tool receptacle (3) which is releasably held by a clamping system (15) with a clamping element (16) in the first tool receptacle (3) of the exterior driveshaft (2), wherein in a second adapter (20) is concentrically and rotatably positioned in the first tool receptacle (3) of the first adapter (10), and the second adapter (20) has a second tool receptacle (25) seated on the first adapter (10) and deflected by a pivot element (30) about a pivot shaft (31), which is arranged eccentrically and parallel with the driveshafts (2, 4), the improvement comprising: the second tool receptacle (25) driven by the exterior driveshaft (2) via the first adapter (10), and means for deflecting the pivot element (30) including the second adapter (20) and a gear train (21, 22, 23, 34), and deflection means for deflecting the pivot element (30) by actuating a brief change of a revolving speed of the interior driveshaft (4) with respect to the exterior driveshaft (2).

2. In the tool holder in accordance with claim 1, wherein the second adapter (20) is connected with the interior driveshaft (4) of the tool drive.

3. In the tool holder in accordance with claim 2, wherein a plurality of adjusting elements are arranged on the first adapter (10) and stops (35) are arranged on the pivot element (30) for limiting the deflection of the pivot element (30).

4. In the tool holder in accordance with claim 3, wherein the second tool receptacle (25) is driven by the interior concentric shaft (4) via the second adapter (20) by the gear train (21, 22, 23, 34).

\* \* \* \* \*